United States Patent [19]

Kubicek

[11] 3,970,406
[45] July 20, 1976

[54] TOOL HOLDER WITH MISALIGNMENT COMPENSATING MEANS

[75] Inventor: Louis A. Kubicek, Ypsilanti, Mich.

[73] Assignee: Burr-Ban Tool Service Company, Detroit, Mich.

[22] Filed: Nov. 15, 1974

[21] Appl. No.: 524,323

[52] U.S. Cl. ............................ 408/127; 279/16; 408/228; 408/239 R; 408/714
[51] Int. Cl.² .......................................... B23B 51/16
[58] Field of Search ........... 408/154, 155, 156, 180, 408/714, 127, 228, 239; 279/16

[56] References Cited
UNITED STATES PATENTS

| 2,628,513 | 2/1953 | Packard | 408/714 X |
|---|---|---|---|
| 2,965,380 | 12/1960 | Benjamin | 279/16 |
| 3,491,625 | 1/1970 | Schulze | 408/127 |
| 3,658,435 | 4/1972 | Kubicek | 408/714 X |

FOREIGN PATENTS OR APPLICATIONS

| 47,843 | 10/1920 | Sweden | 279/16 |

Primary Examiner—Othell M. Simpson
Assistant Examiner—Z. R. Bilinsky
Attorney, Agent, or Firm—Gifford, Chandler & Sheridan

[57] ABSTRACT

A compression tool holder for use with deburring tools or the like, the tool holder having a cylindrical outer housing adapted to be inserted into a chuck of a rotary drive machine. A tool holding rod is axially slidably mounted in a cylindrical recess formed in the tool holder. A spring loaded piston is mounted behind the rod and urges the rod to its extended position. A cap member, however, defines the limit of the extended position for the rod. The rod has an outside diameter somewhat smaller than the inside diameter of the cylindrical recess in the tool holder so that the rod may compensate for misalignment by pivoting relative to the housing within the cylindrical bore, utilizing the cap member as the fulcrum point for its pivot. The end surface of the piston coacts with the end surface of the tool holding rod so as to return the tool holding rod to a central aligned position when misalignment compensation is not required.

8 Claims, 7 Drawing Figures

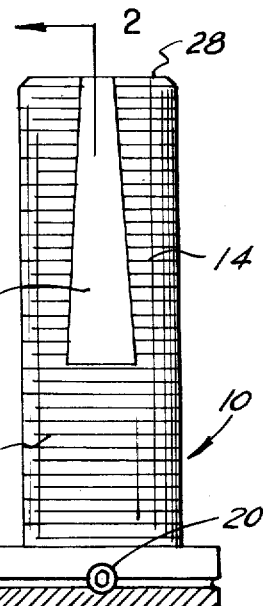
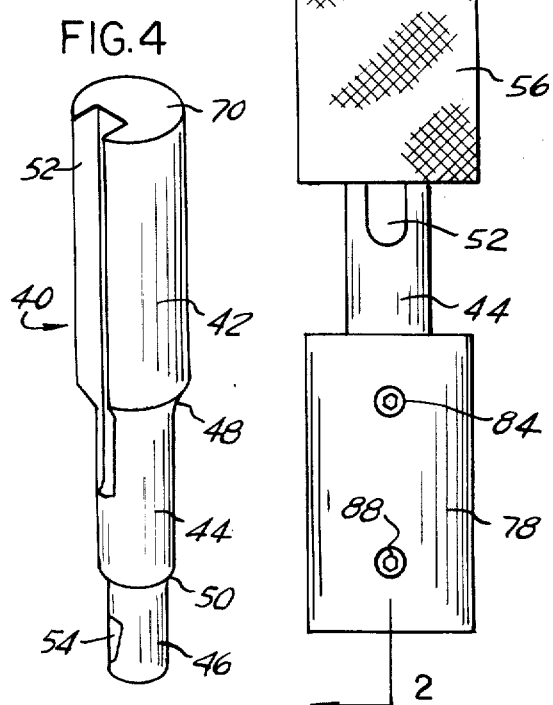
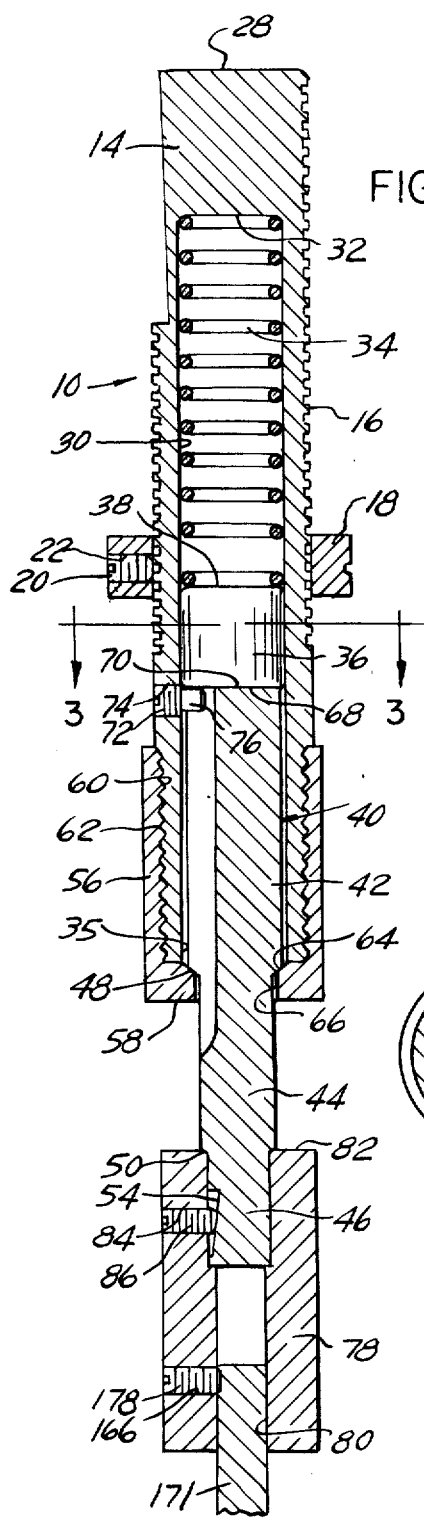
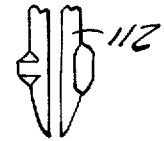

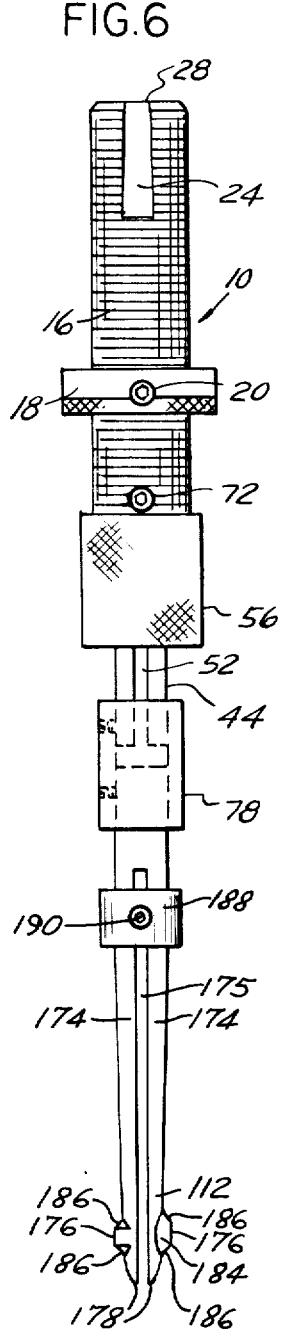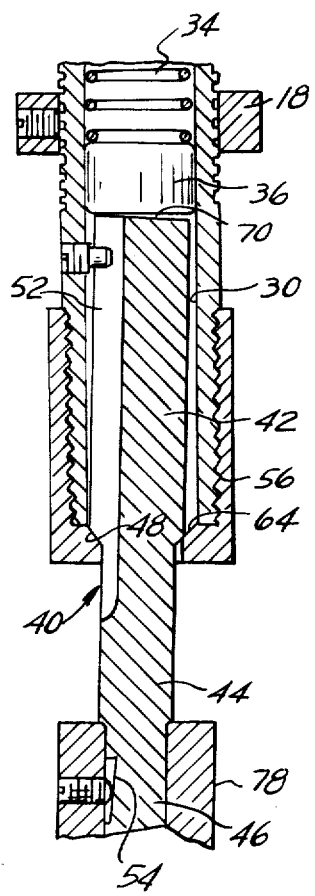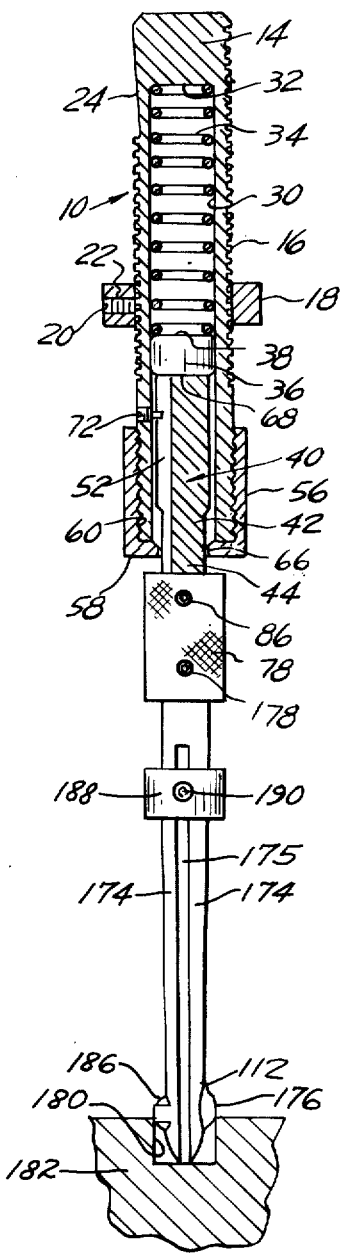

TOOL HOLDER WITH MISALIGNMENT COMPENSATING MEANS

BACKGROUND OF THE INVENTION

I. Field of the Invention

The present invention relates generally to tool holders and more particularly to a tool holder capable of compensating for some amount of misalignment between the tool and the bore in the workpiece.

II. Description of the Prior Art

Tool holders are utilized in many different machining operations such as, for example, deburring operations. Such tool holders have been particularly suitable for and utilized in automated machine operations. A problem which is particularly acute in automated machine operations is that due to machining tolerances and often an accumulation of such tolerances, apertures through the workpiece are not precisely positioned, but rather are displaced from their precise intended position. Thus, for example, when a deburring operation is required, the tool holder must compensate for any displacement of the hole from its intended position.

Many tool holders have been designed which permit the tool held by the tool holder to float relative to the tool holder to compensate for any displacement of the hole through the workpiece from its center and intended location. Such floating tool holders, however, have proven to be not only expensive to manufacture, but also susceptible to breakage and failure. The failure of a tool holder is particularly distressing when it occurs on an automatic assembly line since the entire assembly line often must be shut down to repair or replace the tool holder.

SUMMARY OF THE INVENTION

The present invention eliminates the disadvantages of previously known tool holders of this type by providing a floating tool holder of simple and yet rugged design. The tool holder has a cylindrical outer housing adapted to be inserted into a chuck of a rotary drive machine. A cylindrical recess is formed in the housing and a helical spring and piston are respectively positioned in the cylindrical recess. An elongated tool holding rod, having an enlarged portion which tapers into a reduced portion, is then positioned in the cylindrical recess so that the end of the enlarged portion of the rod abuts against the piston. The outer diameter of the enlarged portion of the rod is somewhat smaller than the diameter of the cylindrical recess. A cap is then inserted over the reduced portion of the rod and is screwed onto the cylindrical outer housing, thus enclosing the enlarged portion of the rod, the piston and the spring within the cylindrical recess. The cap abuts against the tapered portion of the rod and compresses the helical spring. A collet is then secured onto the outwardly extending end of the reduced portion of the tool holding rod for attaching a tool thereto.

In operation, as the tool holder is moved towards a workpiece in which the hole is properly aligned, the tool holder inserts the tool into and removes it from the hole in the conventional fashion. However, when the hole is off center, or otherwise misaligned in the workpiece, the tool will typically intersect one side of the hole rather than the center of the hole. In this situation, the tapered portion of the tool holding rod will pivot around the cap so that the longitudinal axis of the rod is skewed relative to the longitudinal axis of the outer housing, thus permitting the tool to enter the misaligned hole in the workpiece. The enlarged portion of the tool holding rod will simultaneously pivot within the housing recess so that only the periphery of the end of the enlarged portion abuts against the piston. In this last mentioned pivotal motion, the rod increases the spring compression via the piston. When float is no longer required for the tool holder as, for example, when the tool is removed from the misaligned hole, the spring will urge the piston to abut against the flat end of the enlarged portion of the tool holding rod, thereby returning the rod to its axially aligned position.

BRIEF DESCRIPTION OF THE DRAWING

The tool holder of the present invention will be more clearly understood by reference to the following detailed description when read in conjunction with the accompanying drawing wherein like reference characters refer to like parts throughout the several views, and in which:

FIG. 1 is a front plan view showing the tool holder of the present invention;

FIG. 2 is a cross-sectional view taken along line 2—2 in FIG. 1 and enlarged for clarity;

FIG. 3 is a cross-sectional view taken along line 3—3 in FIG. 2;

FIG. 4 is a perspective view showing the tool holding rod of the tool holder of the present invention;

FIG. 5 is a fragmentary cross-sectional view of the tool holder of the present invention;

FIG. 6 is a front plan view showing the tool holder with an attached deburring tool; and FIG. 7 is a partial cross-sectional view of the tool holder with an attached deburring tool.

DETAILED DESCRIPTION OF THE DRAWINGS

Referring to FIG. 1, a tool holder, generally indicated at 10, is adapted to carry a tool (not shown) so that both the tool holder 10 and the tool are rotated about their axes of elongation by the chuck of a suitable rotary drive machine (not shown).

The tool holder 10 includes an outer cylindrical housing 14 which has threads 16 formed along its outer surface for receiving an adjustment collar 18 screwed thereon. The adjustment collar 18 is provided with a set screw 20 threaded into an aperture 22 formed therein for axially positioning the collar along the housing 14. When the housing 14 is inserted into the chuck of a drive machine, the collar 18 engages the front surface of the chuck to axially position the housing 14 in the chuck.

A portion of the threads 16 are ground away to provide a flat surface 24 (FIG. 1) which receives a set screw (not shown) carried by the chuck of the drive machine to secure the outer housing 14 in the chuck. A Woodruff key slot may also be formed in the housing 14 adjacent its rear end 28. The slot would receive a Woodruff key (not shown) carried by the machine chuck for rotatably driving the outer housing 14 about its axis of elongation.

As is best shown in FIG. 2, a cylindrical recess 30 is formed in the outer housing 14 parallel to and coaxial with the axis of elongation of the housing 14. The recess 30 thus has a closed circular end 32 and a lower circular opening 35. A helical spring 34 and a piston 36 are respectively disposed in the cylindrical recess 30 so that the spring 34 is trapped between the end 32 of the cylindrical recess 30 and the end 38 of the piston 36.

The spring 34 preferably has a very high spring constant.

A tool holding rod 40, shown in FIGS. 2 and 4, is generally elongated in shape and has a generally cylindrical cross-sectional area. The tool holding rod 40 has an upper enlarged portion 42, a central reduced portion 44 and a reduced end portion 46 having a smaller cross-sectional area than the central reduced portion 44. A tapered portion 48 forms the junction between the enlarged portion 42 and the central reduced portion 44 while a second tapered portion 50 forms the junction between the central reduced portion 44 and the reduced end portion 46. A slot 52 having a square cross section is also formed along one side of the rod 40 parallel to the longitudinal axis thereof and for a purpose to be later herein described. A flat 54 is also formed along one side of the reduced end portion 46.

A cylindrical cap 56 is provided with internal threads 60 adapted to threadably engage external threads 62 on the lower end of the cylindrical housing 14 so that the cap 56 may be screwed onto the housing 14 in a conventional manner. In addition, the outer surface of the cap 56 is preferably knurled, to facilitate the construction of the tool holder 10 of the present invention.

A round aperture 66 is axially formed through the lower end 58 of the cap 56 so that the reduced portion 44 of the rod 40 may extend axially downwardly through the end of the cap 56. The aperture 66 has a diameter slightly larger than the diameter of the reduced portion 44 of the tool holding rod 40 so that there is some play between the reduced portion 44 of the rod 40 and the aperture 66. In addition, the cap 56 is provided with a circular tapered portion 64 adjacent the aperture 66 which is adapted to abut against the tapered portion 48 of the rod 40.

During the assembly of the tool holder 10 of the present invention, with the spring 34, the piston 36, and the tool holding rod 40 inserted into the cylindrical recess 30, as shown in FIG. 2, the cap 56 is screwed onto the housing 14 so that the tapered portion 64 of the cap 56 abuts against the tapered portion 48 on the tool holding rod 40. The longitudinal length of the cylindrical recess 30 is formed so that as the cap 56 is entirely screwed onto the housing 14 the spring 34 will be in a state of compression. As viewed in the drawings, the lower end 68 of the piston 36 and the upper end 70 of the rod 40 flatly abut against each other so as to maintain the tool holding rod 40 coaxial with the housing 14.

A set screw 72 is threaded into a traverse bore 74 in the housing 14 so that the end 76 of the set screw 72 is received in the slot 52 of the tool holding rod 40. The set screw 72 thus prevents rotational movement of the rod 40 relative to the housing 14, but does not interfere with axial movement of the rod 40 within the cylindrical recess 30.

A cylindrical collet 78 has an axial bore 80 therethrough which is adapted to receive the reduced end portion 46 of the tool holding rod 40. The upper end 82 of the collet 78 abuts against the tapered portion 50 of the rod 40 and a threaded bore 84 is provided traversely through the collet 78. Another set screw 86 is threadably received by the bore 84 and abuts against the flat 54 in the rod 40 to secure the collet 78 to the rod 40.

A second threaded bore 166 is also provided traversely through the collet 78 and is adapted to receive a set screw 178 therethrough. The set screw engages a flat 173 formed on the shank 171 of a deburring tool 112 for securing the tool 112 to the collet 78.

The deburring tool 112, as illustrated in FIGS. 6 and 7, and as shown and described in more detail in U.S. Pat. No. 3,230,798, issued Jan. 25, 1966, is preferably formed with a longitudinally extending tension slot 175 forming a pair of substantially parallel and symmetrical support columns 174. Substantially arcuate cutting ridges or lobes 176 are preferably formed on the periphery of each of the support columns 174. The cutting ridges 176 are spaced axially somewhat from the free ends of the support columns 174 to form a pilot portion 178 to aid in the insertion of the deburring tool 112 into the hole 180 of the workpiece 182 to be deburred. The cutting ridges 176 are provided with substantially radially extending flat surface portions 184. These are disposed in substantially parallel planes on opposite sides of the deburring tool 112 and provide sharp cutting edges 186 at each side of ridges 176.

A collar 188 is slidably mounted around the support columns 174 and is retained in position by means of a set screw 190 integrally carrying a pin (not shown) disposed to extend inwardly into the tension slot 175. When the set screw 190 is tightened against the outer surface of the support columns 174, the pin provides a fulcrum for the support columns 174 at the point of adjustment so that the flexibility of the support columns will depend upon the longitudinal position of the collar 188.

The operation of the present invention will now be described. When the tool is retracted from the workpiece, or otherwise is not operational, the spring loaded piston 36 flatly abuts against the end 70 of the rod 40 and maintains the tool holding rod 40 with its attached tool coaxial with the housing 14. As previously mentioned, the set screw 72 locks the housing 14 to the tool holding rod 40 so that they rotate together. As the tool holder 10 is advanced towards the workpiece with a properly aligned hole, the lower surface 68 of the piston 36 remains in abutment with the upper surface 70 of the tool holding rod 40 so that the rod 40 remains coaxial with the housing 14 throughout the machine operation.

When the tool holder 10 is advanced towards the workpiece with an off-center or otherwise misaligned hole, the tool typically strikes one side or only a portion of the workpiece aperture, thereby producing a lateral force on the tool. Although it is possible that the tool will entirely miss a grossly misaligned aperture, typically the aperture in the workpiece is only slightly misaligned so that the tool will enter at least a portion of the workpiece aperture. The lateral force on the tool will cause the tool holding rod 40 to pivot within the cylindrical recess 30, as shown in FIG. 5, using the tapered portion 64 of the cap 56 as a fulcrum point for the tool holding rod 40 so that the tool may enter the workpiece aperture and continue the machine operation. This pivotal motion causes the upper end 70 of the enlarged portion 42 of the rod 40 to abut against the cylindrical recess 30 so that only the periphery of the upper end 70 of the enlarged portion 42 abuts against the piston 36.

As the tool holding rod 40 pivots within the cylindrical recess 30, the rod 40 forces the piston 36 slightly upward (as viewed in the drawing) thereby increasing the compression of the spring 34. Thus, when the tool is retracted from the workpiece aperture, the spring 34 extends and forces the piston 36 to flatly abut against the end 70 of the tool holding rod 40, thereby returning the rod 40 to a position coaxial with the housing 14.

The tool holder 10 of the present invention has proven to be particularly useful with the deburring tool 112 shown and described above. As more fully described in my U.S. Pat. No. 3,658,435, it is often desirable to provide a compression tool holder whereby the deburring tool 112 may be retracted into the tool holder 10. The compression feature of the tool holder 10 not only permits the deburring tool 112 to dwell momentarily as the tool 112 enters a workpiece aperture, but also prevents breakage of the tool 112 when an improperly formed workpiece aperture is encountered.

The spring 34 serves not only to axially align the tool 112 with the tool holder 10 (as has been previously described in detail), but it also serves as a compression spring so that the deburring tool 112 may be retracted relative to the housing 14 of the tool holder 10. Thus, as shown in FIG. 7, the deburring tool 112 is shown entering a misaligned and improperly formed workpiece aperture 180. The spring 34 compresses so that the tool 112 is retracted relative to the tool holder 10 thereby preventing breakage of the deburring tool 112. It should also be apparent that the strength of the spring 34 may be varied in accordance with the strength of the support columns 174 to obtain the desired dwell of the tool 112 as the tool 112 enters the workpiece aperture.

The tool holder 10 of the present invention in combination with the deburring tool 112 thus provides a compression tool holder with misalignment compensation.

It can thus be seen that the tool holder 10 of the present invention provides a tool holder with misalignment compensating means of simple and yet rugged construction. However, many modifications and alterations thereto will become apparent to those skilled in the art to which the present invention pertains without deviating from the spirit of the invention as defined by the scope of the appended claims.

I claim:

1. The combination of a tool holder and a deburring tool comprising:
   an elongated housing having a recess formed along its axis of elongation;
   resilient means and a piston respectively disposed in said recess;
   an elongated tool holding rod having a cross-sectional area smaller than the cross-sectional area of said recess disposed in said recess so that one end of said tool holding rod flatly abuts against said piston to bias said tool holding rod coaxial with said housing but to permit said tool holding rod to move to a position axially misaligned with respect to said housing;
   a member secured to said housing and having a portion extending into said recess and received by a longitudinal slot formed along one side of said tool holding rod, wherein said member prevents rotation of said rod relative to said housing while permitting axial movement of said rod relative to said housing,
   retaining means to retain said tool holding rod within said recess; and
   means to attach said deburring tool to said tool holding rod so that said deburring tool is coaxial with said tool holding rod, whereby compression of said resilient means permits said deburring tool to retract relative to said housing.

2. The combination as defined in claim 1 wherein said tool holding rod is cylindrical in cross section, having an enlarged diameter portion disposed in said recess and a reduced diameter portion external of said recess, said retaining means comprising a cap secured to said housing, said cap having a round aperture through the end of said cap adapted to receive the reduced diameter portion of said rod therethrough and said aperture through said cap having a diameter smaller than said enlarged diameter portion of said rod.

3. The combination as defined in claim 1 wherein said resilient means is a helical spring.

4. The combination as defined in claim 3 wherein said spring is ordinarily maintained in a state of compression.

5. A tool holder comprising:
   an elongated housing having a cylindrical recess formed along its axis of elongation,
   resilient means and a piston respectively disposed in said recess;
   an elongated cylindrical tool holding rod having an enlarged diameter portion adapted to fit within said recess wherein said recess is of greater diameter than said enlarged diameter portion, said rod further comprising a reduced diameter portion extending coaxially outward from said recess and a tapered portion between said enlarged diameter portion and said reduced diameter portion;
   a cap secured to said housing over said recess, said cap having a round aperture coaxial with said recess for receiving the reduced diameter portion of said rod therethrough, said aperture having a diameter greater than said rod reduced diameter portion and less than said rod enlarged diameter portion, wherein said resilient means is maintained in a state of compression so that said rod tapered portion abuts against said cap aperture and wherein said piston flatly abuts against said rod to ordinarily maintain said rod in axial alignment with said housing while permitting said rod to pivot on said tapered portion around said cap to a position axially misaligned with said housing; and
   means to prevent rotation of said rod relative to said housing and means to attach a tool to said rod.

6. The tool holder as defined in claim 5, wherein said cap included a tapered portion around said aperture adapted to abut against said rod tapered portion.

7. The tool holder defined in claim 5 wherein said resilient means is a helical spring.

8. The invention as defined in claim 5 wherein said means to prevent the rotation of said tool holding rod relative to said housing comprises a member secured to said housing, said member having a portion extending into said recess and received by a longitudinal slot formed along one side of said tool holding rod to prevent rotation of said rod relative to said housing while permitting axial movement of said rod relative to said housing.